United States Patent [19]

Ngai

[11] Patent Number: 5,784,055
[45] Date of Patent: Jul. 21, 1998

[54] COLOR CONTROL FOR ON-SCREEN DISPLAY IN DIGITAL VIDEO

[75] Inventor: Chuck Hong Ngai, Endwell, N.Y.

[73] Assignee: International Business Machines Corporation, Armonk, N.Y.

[21] Appl. No.: 643,651

[22] Filed: May 6, 1996

[51] Int. Cl.⁶ .................................................. G09G 5/06
[52] U.S. Cl. .................. 345/199; 345/203; 345/153; 345/509
[58] Field of Search ................ 345/112–115, 150–155, 345/507, 186, 509, 199, 203

[56] References Cited

U.S. PATENT DOCUMENTS

| | | | |
|---|---|---|---|
| 4,683,466 | 7/1987 | Holtey et al. | 345/510 |
| 4,692,757 | 9/1987 | Tsuhara et al. | 345/116 |
| 4,757,470 | 7/1988 | Bruce et al. | 345/435 |
| 4,771,275 | 9/1988 | Sanders | 345/186 |
| 5,043,917 | 8/1991 | Okamoto | 345/515 |
| 5,201,027 | 4/1993 | Casini | 395/107 |
| 5,258,747 | 11/1993 | Oda et al. | 345/153 |
| 5,270,688 | 12/1993 | Dawson et al. | 345/150 |
| 5,291,188 | 3/1994 | McIntyre | 345/509 |
| 5,430,465 | 7/1995 | Sabella et al. | 345/199 |
| 5,502,462 | 3/1996 | Mical et al. | 345/507 |
| 5,572,235 | 11/1996 | Mical et al. | 345/150 |
| 5,596,693 | 1/1997 | Needle et al. | 345/474 |
| 5,684,895 | 11/1997 | Harrington | 345/199 |

*Primary Examiner*—Matthew M. Kim
*Assistant Examiner*—U. Chauhan
*Attorney, Agent, or Firm*—Richard M. Goldman; John R. Pivnichny

[57] ABSTRACT

A method of performing color control in a digital video decoder while minimizing memory bandwidth. A decoded color image bit map is stored in a RAM in lines corresponding to horizontal lines of pixels. Each line also has dedicated bytes for a corresponding color look up table comprising a control field and color address fields. Entries in separate preloaded color component tables are addressed by the color address fields. A transparency bit in the control field is used to select modifiers to the data in the address fields for transparency mode.

10 Claims, 5 Drawing Sheets

BITMAP DATA FROM DRAM

| COLOR-LOOK-UP TABLE -8 BYTES | BITMAP - 90 BYTES 2 BITS/PIXEL-PAIR |
|---|---|

ADDRESS FIELDS FOR SELECTED COLORS

```
     1      1 2     2 2        2
     6      9 0     3 4        7
```

| T=0 | Y0 ADDR | U0 ADDR | V0 ADDR |
|---|---|---|---|

```
     1      1 2     2 2        2
     6      9 0     3 4        7
```

| T=1 | Y MODIF | U MODIF | V MODIF |
|---|---|---|---|

```
 2    3 3    3 3    3 4    4 4    4 4    5 5    5 5    5 6    6
 8    1 2    5 6    9 0    3 4    7 8    1 2    5 6    9 0    3
```

| Y1 ADDR | U1 ADDR | V1 ADDR | Y2 ADDR | U2 ADDR | V2 ADDR | Y3 ADDR | U3 ADDR | V3 ADDR |
|---|---|---|---|---|---|---|---|---|

BITMAP DATA FROM DRAM

| COLOR-LOOK-UP TABLE -8 BYTES | BITMAP - 90 BYTES 2 BITS/PIXEL-PAIR |

COLOR-LOOK-UP TABLE

| CONTROL | FOUR SELECTED COLORS ADDRESSES |
| 2 BYTES | 6 BYTES |

```
CONTROL
         0 0                              0 1  1  1  1  1  1
  BITS   0 1                              9 0  1  2  3  4  5
```

| T | PIXEL-PAIR ADDRESS | M1 | M2 | M3 |

T = 1 - TRANSPARENCY ON
  = 0 - TRANSPARENCY OFF

PIXEL-PAIR ADDRESS -   STARTING ADDRESS FOR THE
   MODIFIED COLOR REGION ON A LINE. SETTING THIS
   FIELD TO ALL 1'S WILL DISABLE THE MODIFICATION
   BECAUSE THIS ADDRESS VALUE CANNOT BE REACHED.

M1 - MODIFY CONTROL FOR LOOK-UP TABLE
     COLOR 1 ADDRESSES

M2 - MODIFY CONTROL FOR LOOK-UP TABLE
     COLOR 2 ADDRESSES

M3 - MODIFY CONTROL FOR LOOK-UP TABLE
     COLOR 3 ADDRESSES

M1, M2 & M3 = 00 - MODIFY Y ONLY
              01 - MODIFY U ONLY
              10 - MODIFY V ONLY
              11 - MODIFY YUV

FIG. 6

ADDRESS FIELDS FOR SELECTED COLORS

```
       1        1 2       2 2        2
       6        9 0       3 4        7
```

| T=0 | Y0 ADDR | U0 ADDR | V0 ADDR |

```
       1        1 2       2 2        2
       6        9 0       3 4        7
```

| T=1 | Y MODIF | U MODIF | V MODIF |

```
 2 3  3  3 3  3 4  4 4  4 4  5 5  5 5  5 6  6
 8 1  2  5 6  9 0  3 4  7 8  1 2  5 6  9 0  3
```

| Y1 ADDR | U1 ADDR | V1 ADDR | Y2 ADDR | U2 ADDR | V2 ADDR | Y3 ADDR | U3 ADDR | V3 ADDR |

COLOR CONTROL FOR ON-SCREEN DISPLAY IN DIGITAL VIDEO

FIELD OF THE INVENTION

This invention relates to video decoders, especially video decoders intended to decode and decompress compressed encoded video signals, e.g., discrete cosine transform encoded video signals. The method is for storing a decoded multi-color digital image bit map in a RAM for display. The bit map is stored in lines corresponding to horizontal lines of pixels. Each line has a line-based color look up table and individual pixels or pixel sets. The method, apparatus, and system of the invention are useful in decoding broadcast signals, cablecast signals, and digital network signals, as well as in high definition television, interactive television, multimedia, video on demand, video conferencing, and digital video recording. The system and apparatus of the invention may be a "stand alone" unit, as a set top box or a digital entertainment terminal, or the like, as a component of a television set, a personal computer, work station, or other computer, as a unit contained on one or more printed circuit boards, or as part of a video recorder or dedicated teleconferencing unit.

BACKGROUND OF THE INVENTION

The Moving Picture Experts' Group (MPEG) MPEG-2 Standard is a compression/decompression standard for video applications. The standard describes an encoded and compressed datastream that has substantial bandwidth reduction. The compression is a subjective loss compression followed by a loss less compression. The encoded, compressed digital video data is subsequently decompressed and decoded in an MPEG-2 Standard compliant decoder.

The MPEG-2 Standard is described in, e.g., C. A. Gonzales and E. Viscito, "Motion Video Adaptive Quantization In The Transform Domain," *IEEE Trans Circuits Syst Video Technol*, Volume 1, No. 4, December 1991, pp. 374–378, E. Viscito and C. A. Gonzales, "Encoding of Motion Video Sequences for the MPEG Environment Using Arithmetic Coding," SPIE, Vol. 1360, pp. 1572–1576, (1990), D. LeGall, "MPEG: A Video Compression Standard for Multimedia Applications," *Communications of the ACM*, Vol. 34, No. 4, (April 1991), pp. 46–58, S. Purcell and D. Galbi, "C Cube MPEG Video Processor," SPIE, v. 1659, (1992) pp. 24–29, and D. J. LeGall, "MPEG Video Compression Algorithm," *Signal Process Image Commun*, v. 4, n. 2, (1992), pp. 129–140, among others.

The MPEG-2 Standard specifies a datastream from and a decoder for very high compression technique that achieves overall image datastream compression not achievable with either intraframe coding alone or interframe coding alone, while preserving the random access advantages of pure intraframe coding. The combination of block based frequency domain intraframe encoding and interpolative/predictive interframe encoding of the MPEG-2 Standard result in a balance between intraframe encoding alone and interframe encoding alone.

The MPEG-2 Standard exploits temporal redundancy for motion compensated interpolative and predictive encoding. That is, the assumption is made that "locally" the current picture can be modeled as a translation of the picture at a previous and/or future time. "Locally" means that the amplitude and direction of the displacement are not the same everywhere in the picture.

The MPEG-2 Standard specifies predictive and interpolative interframe encoding and frequency domain intraframe encoding. It has block based motion compensation for the reduction of temporal redundancy, and block based Discrete Cosine Transform based compression for the reduction of spatial redundancy. Under MPEG-2 Standard motion compensation is achieved by predictive coding, interpolative coding, and Variable Length Coded motion vectors. The information relative to motion is based on a 16×16 array of pixels and is transmitted with the spatial information. Motion information is compressed with Variable Length Codes, such as Huffman codes.

The MPEG-2 Standard provides temporal redundancy reduction through the use of various predictive and interpolative tools. This is illustrated in FIG. 1. FIG. 1 shows three types of frames or pictures, "I" Intrapictures, "P" Predicted Pictures, and "B" Bidirectional Interpolated Pictures. Note that for interframe encoding, as IP and IPB encoding, picture transmission order is not the same as picture display order.

Motion compensation goes to the redundancy between pictures. The formation of "P" Predicted Pictures from "I" Intrapictures and of "B" Bidirectional Coded Pictures from a pair of past and future pictures is a key feature of the MPEG-2 Standard technique.

The "I" Intrapictures provide moderate compression, and are access points for random access, e.g., in the case of video tapes or CD ROMS. As a matter of convenience, one "I" Intrapicture is provided approximately every half second that is, every ten to twenty pictures. The "I" Intrapicture only gets information from itself. It does not receive information from an "P" Predicted Picture or "B" Bidirectional Interpolated Picture. Scene cuts preferably occur at "I" Intrapictures.

"P" Predicted Pictures are coded with respect to a previous picture. "P" Predicted Pictures are used as the reference for future pictures, both "P" and "B" pictures.

"B" Bidirectional Coded pictures have the highest degree of compression. They require both a past picture and a future picture for reconstruction. "B" bidirectional pictures are never used as a reference.

The motion compensation unit under the MPEG-2 Standard is the Macroblock unit. The MPEG-2 Standard Macroblocks are 16×16 pixels. Motion information consists of one vector for forward predicted macroblocks, one vector for backward predicted macroblocks, and two vectors for bidirectionally predicted macroblocks. The motion information associated with each macroblock is coded differentially with respect to the motion information present in the reference macroblock. In this way a macroblock of pixels is predicted by a translation of a macroblock of pixels from a past or future picture.

The difference between the source pixels and the predicted pixels is included in the corresponding bit stream. The decoder adds a correction term to the block of predicted pixels to produce the reconstructed block.

As described above and illustrated in FIG. 1, each macroblock of a "P" Predicted Picture can be coded with respect to the closest previous "I" Intrapicture, or with respect to the closest previous "P" Predicted Picture.

Further, as described above and illustrated in FIG. 1, each macroblock of a "B" Bidirectional Picture can be coded by forward prediction from the closest past "I" or "P" Picture, by backward prediction from the closest future "I" or "P" Picture, or bidirectionally, using both the closest past "I" or "P" picture and the closest "future "I" or "P" picture. Full bidirectional prediction is the least noisy prediction.

Motion information is sent with each macroblock to show what part of the reference picture is to be used as a predictor.

As noted above, motion vectors are coded differentially with respect to motion vectors of the previous adjacent block. Variable Length Coding is used to code the differential motion vector so that only a small number of bits are needed to code the motion vector in the common case, where the motion vector for a macroblock is nearly equal to the motion vector for a preceding macroblock.

Spatial redundancy is the redundancy within a picture. Because of the macroblock based nature of the motion compensation process, described above, it was desirable for the MPEG-2 Standard to use a block based method of reducing spatial redundancy. The method of choice is the Discrete Cosine Transformation, and Discrete Cosine Transform coding of the picture. Discrete Cosine Transform coding is combined with weighted scalar quantization and run length coding to achieve still further levels of compression.

The Discrete Cosine Transformation is an orthogonal transformation. Orthogonal transformations, because they have a frequency domain interpretation, are filter bank oriented. The Discrete Cosine Transformation is also localized. That is, the encoding process samples on an 8×8 spatial window which is sufficient to compute 64 transform coefficients or sub-bands.

Another advantage of the Discrete Cosine Transformation is that fast encoding and decoding algorithms are available. Additionally, the sub-band decomposition of the Discrete Cosine Transformation is sufficiently well behaved to allow effective use of psychovisual criteria.

After Discrete Cosine transformation, many of the higher frequency coefficients are zero. These coefficients are organized into a zig-zag, as shown in FIG. 2, and converted into run-amplitude (run-level) pairs. Each pair indicates the number of zero coefficients and the amplitude of the non-zero coefficient. This is coded in a Variable Length Code.

Discrete Cosine Transformation encoding is carried out in the three stages as shown in FIG. 2. The first stage is the computation of the Discrete Cosine Transformation coefficients. The second step is the quantization of the coefficients. The third step is the conversion of the quantized transform coefficients into {run-amplitude} pairs after reorganization of the data into zig-zag scanning order.

Quantization can be viewed as a shift right by several bits. Quantization enables very high degrees of compression, and a high output bit rate, and retains high picture quality.

Quantization can be adaptive, with "I" Intrapictures having fine quantization to avoid "blockiness" in the reconstructed image. This is important because "I" Intrapictures contain energy at all frequencies. By way of contrast, "P" and "B" pictures contain predominantly high frequency energy and can be coded at a coarser quantization.

One challenge facing decoder designers is the accommodation of a single decoder system to a variety of display output formats, while complying fully with luminance/chrominance relationships and the MPEG2 standard.

MPEG 2 Video decoder/display functions are required to transform the presentation aspect ratio of the decoded source video stream to fit the needs of the environment to which the decoder/display function is installed.

The displayed output of the decoder chip must conform to CCIR recommendation 601. This specifies the number of luminance and chrominance pixels in a single active line, and also how the chrominance pixels are subsampled relative to the luminance signals. The format defined as 4:2:2 is supported in most cases in the industry. This defines 720 active luminance signals (Y), and 360 color difference signals (Cb, Cr pairs), where each line of luminance signals has corresponding line of chrominance signals. CCIR recommendation 656 goes on to define the number of active lines for NTSC and PAL environments as 480 and 576, respectively.

This is accomplished by the On Screen Display. An On Screen Display is a feature used in the digital video application to overlay a picture on the monitor screen with a bitmap image. The size of the bitmap is usually full screen which is, in the case of computer displays, typically 720× 480 pixels. This bitmap is usually stored in the DRAM and is accessed for every picture displayed. Each pixel is encoded by several bits. Two bits will provide 4 colors, three bits will provide 8 colors, and so on. But, too many bits will have a negative impact on the memory bandwidth as well as the memory size. Thus, a need exists for providing a color display bitmap while minimizing memory bandwidth.

OBJECTS OF THE INVENTION

It is a primary object of the invention to provide a color display bitmap with a minimum memory bandwidth.

It is a further object of the invention to provide an increased number of color selections while maintaining a minimum bitmap size requirement.

SUMMARY OF THE INVENTION

These objectives are attained by the method and apparatus of my invention. The method and apparatus are for storing a decoded multi-color digital image bit map in a RAM for display. The bit map is stored in lines corresponding to horizontal lines of pixels. Each line has a line-based color look up table and individual pixels or pixel sets. The system can work with various downstream video elements, such as a digital computer, a television set, a recorder, or a network. The video decoder can be in combination with an audio decoder, separated therefrom by a suitable demultiplexer.

The decoder system of the invention can be included in a stand-alone system, as a separate accessory, that is, a "set top box." Alternatively, the decoder of the system can be integrally incorporated into the television set, computer, or other video device. Thus, the decoder can be integrated with a downstream element such as a digital computer, a television set, a recorder, or a network. In this alternative embodiment the decoder system is incorporated on one or more printed circuit boards in the downstream element.

According to a still further embodiment of the invention there is provided a complete digital video and audio entertainment system or a digital video and audio information system including the digital signal decoder system for receiving encoded compressed digital video signals and transmitting decoded decompressed digital video signals, for example to a consumer television set, a teleconferencing unit, a computer, or a redistribution network. The system includes main memory, the FIFO Data Buffer, the Variable Length Code Decoder, the Inverse Quantizer, the Inverse Discrete Cosine Transform Decoder, the Motion Compensator, the Display Unit, the poly-phase finite impulse response horizontal filter, and the Controller, as well as an audio decoder unit and an output unit such as a television set, a recorder, a computer, or a network for rebroadcast.

THE FIGURES

The invention may be understood by reference to the FIGURES appended hereto.

FIG. 6 shows the dual usage table, for controlling the three table color look up table through the T bit of the dual usage table. As shown, when the one bit is 0 the three table color look up table represents a color, and when the one bit is 1 the dual usage table is a modifier field.

FIG. 7 shows the dual usage table when the T bit is 0, and the table has color addresses.

DETAILED DESCRIPTION OF THE INVENTION

In a preferred embodiment of the invention the decoder system complies fully with the Moving Picture Experts Group MPEG-2 Standard Main Profile at the Main Level, as defined in the MPEG documentation. Thus, the system can receive compressed video data at a rate of 15 Mbs/second, and the system can operate at a 40 MHz clock frequency. In the MPEG-2 Standard the data format for the compressed, encoded data is YCbCr (4:2:0).

The On Screen Display supports various formats. The CCIR 601 format, 720×480, will be used for purposes of illustration. The bitmap which is stored in the DRAM is defined to cover the whole screen. Each horizontal pixel-pair is represented by two bits. These two bits are used to select one of the four colors from the look-up table. Usually one of the decode is used for transparency to show the picture to be overlayed. Thus only three colors are available for selection if the transparency is used. Each horizontal line has its own look-up table. Thus each line can have a different set of colors to choose from. Also within the same line, the three colors from the look-up table could be modified to three different colors. Effectively, there are 2×480 color regions on the screen. The colors are chosen from 4096 pre-loaded colors.

Figure 1:
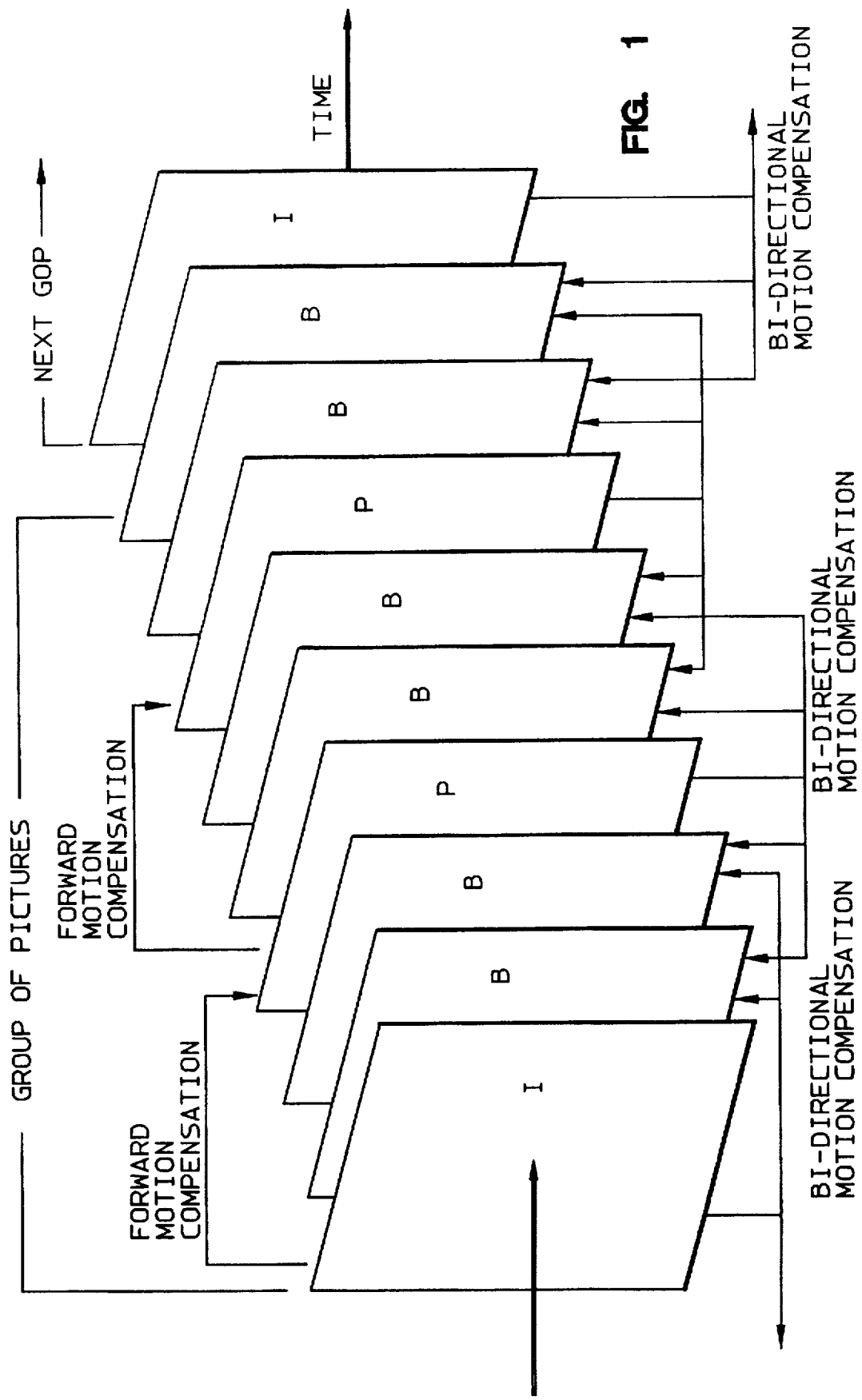
FIG. 1 shows the three type of pictures and their relationship under the MPEG-2 Standard, i.e., "I" Intrapictures, "P" Predicted Pictures, and "B" Bidirectionally Predicted Pictures.
Figure 2:
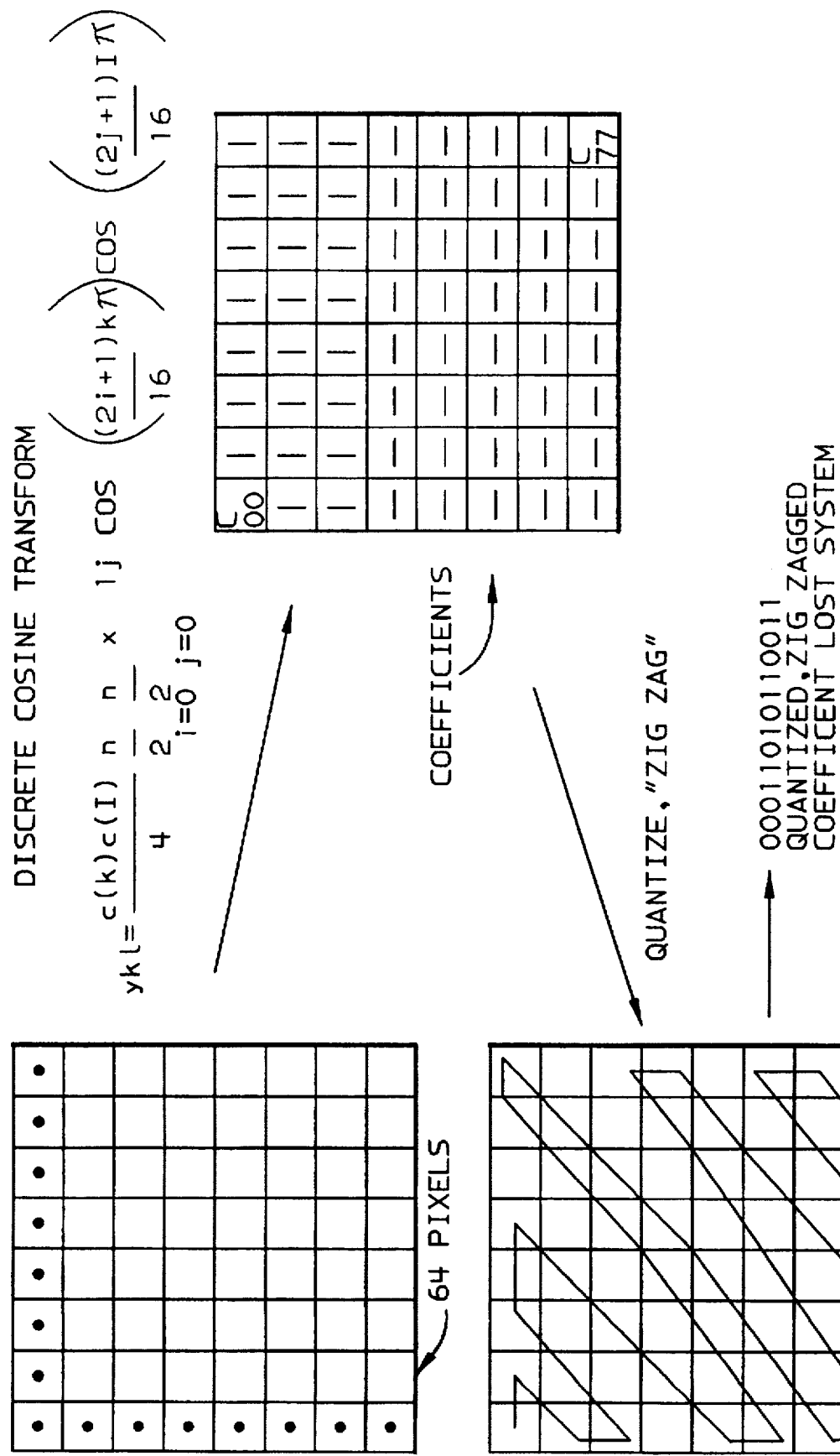
FIG. 2 shows the sequence of compressing a frame or picture, including calculating the Discrete Cosine Transform coefficients, contusing the Discrete Cosine Transform coefficients, and "zig-zagging" the quantified Discrete Cosine Transform coefficients.
Figures 3, 4, 5:
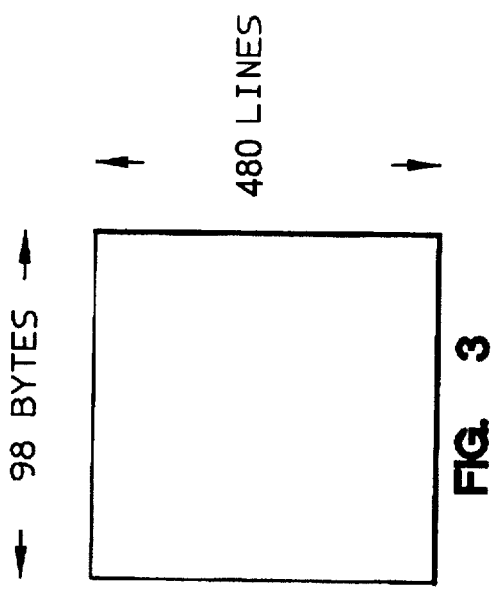
FIG. 3 shows a representation of memory 98 bytes wide by 480 lines deep. It is to be understood that this can be in a plurality of integrated circuit chips.
FIG. 4 shows the bitmap data from the DRAM, with a color look up table of 8 bytes and a bitmap of 90 bytes.
FIG. 5 shows a color look up table with 2 bytes of control, and 6 bytes with four selected color addresses.

As shown in FIG. 3 the bitmap is organized in 98 bytes×480 lines. Each line consists of 8 bytes for the color-look-up table and 90 bytes for the 720 pixels, as shown in FIG. 4. To reduce the bitmap size, two pixels share the same color. The total number of bytes for the bitmap is 47040.

The color lookup table is shown in FIG. 5, with further detail shown in FIG. 6. Each entry in the color lookup table consists of the Control field, which is 2 bytes, and 6 bytes for four selected color addresses. In the Control field, the transparency bit, T, is used to select the 4-color mode or the transparency mode. The Pixel-Pair Address field is used to determine where the modification starts on that pixel line. The colors of each look-up table are modified by XORING the 4-bit modifier with the YUV data of the look-up table. The control bits, M1, M2, and M3 determine how the colors should be changed. To modify the table, the transparency mode bit must be 1.

Figure 8:
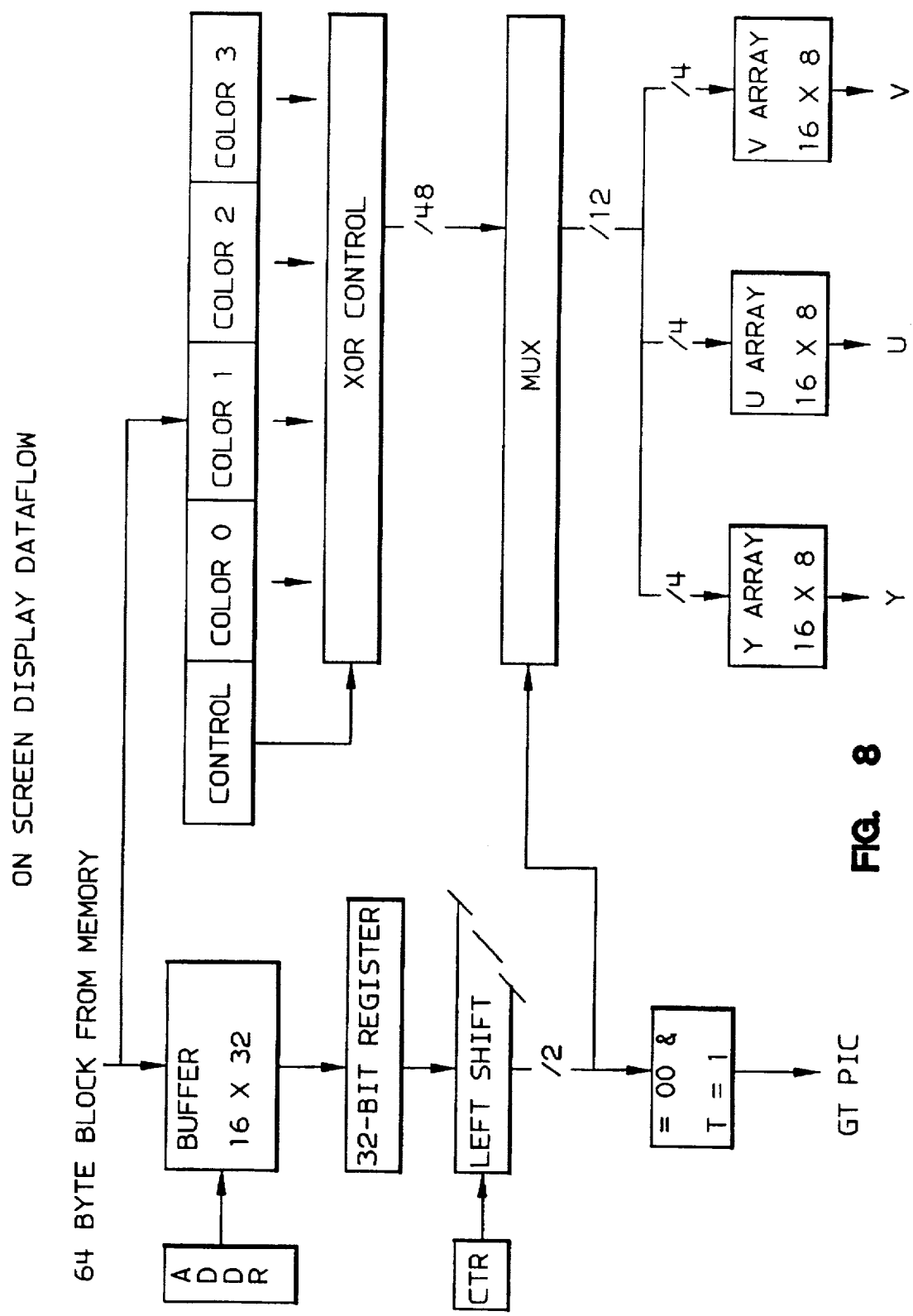
FIG. 8 is a representation of the on screen display data flow.

As shown in FIG. 8, the color components, luminance, Y, and the chrominance, U and V are stored in three separate tables which are preloaded. Each table has 16 entries and each entry is 8 bits wide. Thus, these three tables will generate 4096 different colors. The YUV address fields are used to address the entries from these three tables.

The first color field, bits 16–27 of the color-look-up table, FIG. 7, is a dual usage field. When the T bit is 0, it represents a color. When the T bit is 1, it becomes the modifier field for the other three color fields. Bits 28–39 represent the second color field. Bits 40–51 represent the third color field and bits 52–63 represent the fourth color.

The 90 bytes of bitmap data are used to produce the colors for the 360 pixel-pairs in each line. Each pixel-pair has two bits to select one of the four colors, or three colors plus the transparency. These four-bit addresses select the entries from the corresponding tables for the display.

The operation is shown in the diagram of FIG. 8. The three color tables, YUV tables, are initialized to the colors of choice. The bitmap of an overlay is assumed to be written into the DRAM and of course it can be changed anytime. A block of bitmap data, usually 64 bytes, are fetched from the memory and stored in a buffer. An address control unit, ADDR, is used to control the writing and the reading of the buffer. If this block of data is the beginning of a line, the first 8 bytes are loaded into the Color-look-up Table register. The control field of this register controls the color modification. A counter which is used by the display to keep track of the horizontal pixel can be used to compare with the Pixel-pair Address to determine where the color modification should start.

Once the buffer is filled, the first 32 bits of the bitmap is loaded into the register at the output of the buffer. A 4-bitcounter, CTR, is used to control a left shifter such that two bits will come out every pixel clock cycle. These two bits then select one of the four groups of addresses used to address the YUV tables. The contents of the tables are sent to the display unit. If the T bit is 1, and the bits are 00', a signal is generated to tell the display unit to display the picture data instead of the overlay data.

While the invention has been described with respect to certain preferred embodiments and exemplifications, it is not intended to limit the scope of the invention thereby, but solely by the claims appended hereto.

I claim:

1. A method of storing a decoded multi-color digital image bit map in a RAM for display, comprising the steps of:

storing said bit map in lines corresponding to horizontal lines of pixels, wherein each line has a line-based color look up table and individual pixels or pixel sets; and each line has dedicated bytes for line-based color look up tables and dedicated bytes for pixels or pixel sets.

2. The method of claim 2 wherein the line based color look up tables each comprise a control field and color addresses.

3. The method of claim 2 wherein the control field of the line based color look up table has a transparency bit to select between a color mode and a transparency mode.

4. The method of claim 1 wherein each line-based color look up table comprises 8 bytes.

5. The method of claim 1 wherein pixels are arrayed in pixel sets, and each pixel set has at least two bits.

6. The method of claim 5 wherein the pixels are arrayed with pixel sets of two pixels per set, and each pixel set has two bits.

7. The method of claim 1 further comprising the step of storing color components in separate, preloaded tables wherein said preloaded tables have entries which are addressed by said color look up tables.

8. The method of claim 7 comprising storing the color components Y, U, and V, in three separate tables, each of said tables having sixteen 8 bit entries.

9. The method of claim 8 in which said three separate tables are preloaded with colors of choice.

10. A method of storing a decoded multi-color digital image bit map in a RAM for display, comprising the steps of:

storing said bit map in lines corresponding to horizontal lines of pixels, wherein each line has a line-based color look up table and individual pixels or pixel sets, and wherein said color look up table has a dual usage address field representing either a color field or a modifier field for three other color fields, said dual usage address field controlled by one bit of a control field of said color look up table; and storing color components Y, U, and V, in three separate color component tables, each of said tables having sixteen 8 bit entries, wherein said color component tables have entries which are addressed by said color look up tables.

\* \* \* \* \*